S. PYTLAK.
MOUSETRAP.
APPLICATION FILED JUNE 24, 1921.
1,432,300.
Patented Oct. 17, 1922.
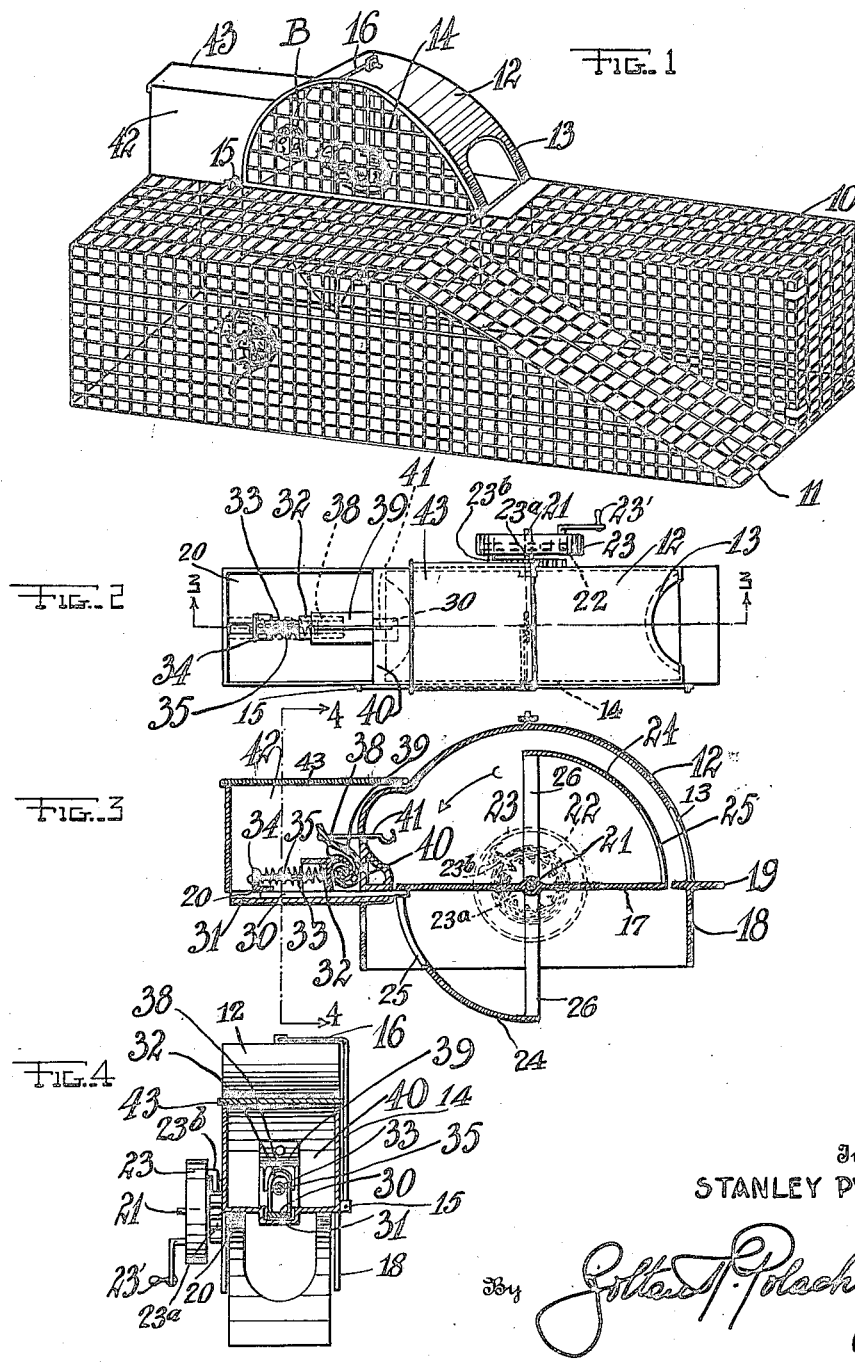

Patented Oct. 17, 1922.

1,432,300

UNITED STATES PATENT OFFICE.

STANLEY PYTLAK, OF McMECHEN, WEST VIRGINIA.

MOUSETRAP.

Application filed June 24, 1921. Serial No. 480,117.

*To all whom it may concern:*

Be it known that I, STANLEY PYTLAK, a citizen of Poland, residing at McMechen, in the county of Marshall and State of West Virginia, have invented certain new and useful Improvements in Mousetraps, of which the following is a specification.

This invention relates to animal traps, being intended more particularly for embodiment in a mouse or rat trap.

The invention has for an object the provision of a novel arrangement comprising a main cage and a separate bait compartment, means being provided for throwing the mouse into the main compartment when the bait is disturbed.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view of a mouse trap constructed according to the invention.

Fig. 2 is a plan view of the upper or entrance part showing the bait holding trigger element and the device for discharging the mouse into the main cage.

Fig. 3 is a longitudinal vertical section on the line 3—3 of Fig. 2.

Fig. 4 is a transverse section on the line 4—4 of Fig. 3.

As here shown my improved trap comprises a main cage 10 of rectangular shape and formed to present an inclined runway 11 leading to the top thereof. Upon the top of the cage a semi-cylindrical housing 12 is mounted and is provided with an opening 13 at one side thereof. One of the transverse walls, indicated at 14 of the housing, is preferably made of wire mesh like the cage 10 so as to enable the interior to be seen, this wall being hinged at its lower edge as at 15 to form a door and being held in place at its upper edge by a hooked latch 16.

The portion of the cage top which is enclosed by the housing 12 is in the form of a trap door 17 which is pivoted in the housing midway between its ends, being enclosed by a flange 18 on the housing which extends into the cage, the housing having horizontal flange extensions 19 and 20 at opposite ends which rest on the top of the cage.

The door 17 is fixed on a shaft 21 suitably supported in the housing concentric thereto and is normally urged to rotate by means of a clock spring 22 carried in a casing 23 on the end of shaft 21. The spring 22 is fixed at one end to the casing, which is provided with a handle 23' for rotation, a ratchet wheel 23$^a$ being secured on the side of the housing 12 and adapted to be engaged by a spring pressed pawl 23$^b$ carried by the casing to hold the spring 22 wound. Rigidly carried with respect to the door 17 are diametrically opposed quadrantal members 24 which are of equal width to the door 17 and are arranged to present openings 25 either one of which may rest adjacent and in registry with the opening 13, these quadrantal members being shown as fixed at one end to the end of spoke elements 26 on shaft 21, and to the ends of door 17 at their opposite ends.

The door 17 is held against rotation by a sliding latch 30 held in a guide 31 under the flange extension 20, and adapted to engage under the edge of the door. The latch 30 has fixed to the upper face thereof a rearwardly facing socket 32 in which one end of a coiled expansion spring 33 engages, the opposite end bearing on an abutment bracket 34 fixed to the member 20. A pin 35 is also fixed to this bracket 34 and extends axially through the spring 33 to prevent axial bending of the latter. As will be apparent, the spring 33 normally urges the latch 30 to its operative position.

Upon the forward end of the socket 32 a hook 38 is formed which engages in a complementary recess in a trigger element 39 having a rounded forward side, which bears upon a plate 40 diverging from the adjacent wall of the housing 10. This trigger 39 has fixed thereto a bait hook 41 which projects through a suitable aperture into the housing a short distance above the door 17. The trigger and spring may be enclosed in a compartment 42 of which the member 20 forms the bottom, this compartment having a hinged top 43.

It is believed that the manner of operation and use of my improved trap will be readily understood from the above description. In setting the trap the door 14 of housing 12 is opened and the bait placed on the hook 41 as indicated at B in Fig. 1, this hook projecting through the side of the housing 10 opposite the entrance opening 13. The clock spring 22 is then wound up, imparting a turning moment to shaft 21 in a direction to swing the end of door 17, adjacent hook 41 downward, this movement of the door being prevented by the engagement of the latch 30 under the edge thereof.

To reach the bait B the animal must enter the housing 12 through the entrance 13 and walk along door 17. When the hook 41 is pulled the lever 39 is moved, the rounded forward side of the lever rolling on the wall members 40, and by its engagement with hook 38 which is fixed to latch 30, moves the latter back until it disengages from the door 17, the spring 22 immediately swinging the latter and causing the animal to be thrown into the cage 10. The hook 41 being released, the spring 33 throws the latch 30 forward again and the door 17, after making a half revolution, comes to rest with its other end engaged by the latch 30.

Having thus described my invention what I claim as new and desire to protect by Letters Patent of the United States is as follows:

1. In a trap, a cage, a trap door, a slidable latch engaging said door, a hooked socket element fixed to said latch, an expansion spring engaged in said socket, a trigger lever engaged at one end with the said hooked socket element and having a bait holding member on its opposite end.

2. In a trap, a cage, a trap door, a slidable latch engaging said door, a hooked socket element fixed to said latch, an expansion spring engaged in said socket, a trigger lever engaged at one end with the said hooked socket element and having a bait holding member on its opposite end, said trigger lever presenting a rounded fulcrum face pressed against an abutment element by said spring.

In testimony whereof I have affixed my signature.

STANLEY PYTLAK.